(12) United States Patent
Morita et al.

(10) Patent No.: US 11,840,187 B2
(45) Date of Patent: Dec. 12, 2023

(54) AIRBAG HOLDING COVER AND VEHICLE AIRBAG DEVICE

(71) Applicant: Autoliv Development AB, Vargarda (SE)

(72) Inventors: Kazuki Morita, Kanagawa (JP); Keitoku Miyagi, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/753,064

(22) PCT Filed: Jul. 22, 2020

(86) PCT No.: PCT/JP2020/028477
§ 371 (c)(1),
(2) Date: Feb. 17, 2022

(87) PCT Pub. No.: WO2021/033487
PCT Pub. Date: Feb. 25, 2021

(65) Prior Publication Data
US 2022/0371538 A1 Nov. 24, 2022

(30) Foreign Application Priority Data
Aug. 22, 2019 (JP) .................... 2019-152300

(51) Int. Cl.
*B60R 21/201* (2011.01)
*B60R 21/203* (2006.01)
(Continued)

(52) U.S. Cl.
CPC ........ *B60R 21/201* (2013.01); *B60R 21/2035* (2013.01); *B60R 21/215* (2013.01); *B60R 21/21656* (2013.01)

(58) Field of Classification Search
CPC .................................................... B60R 21/201
See application file for complete search history.

(56) References Cited

U.S. PATENT DOCUMENTS 7,845,672 B2 * 12/2010 Onohara ............... B60R 21/201
280/732
7,878,534 B2 * 2/2011 Kumagai ............ B60R 21/2338
280/743.1
(Continued)

FOREIGN PATENT DOCUMENTS

DE 60306001 T2 * 1/2007 ......... B60R 21/233
DE 102016117427 A1 * 3/2017 ............. B60R 21/20
(Continued)

*Primary Examiner* — Nicole T Verley
(74) *Attorney, Agent, or Firm* — Foley & Lardner LLP

(57) ABSTRACT

A retaining cover that encapsulates a cushion which is stowed in a bulk stowed form in front of the regular seating position of the vehicle having a side surface retaining part wound around a side surface of the cushion in stowed form, a cloth-like part provided in a manner traversing vertically across the upper surface of the cushion in stowed form, and a weak part provided at a prescribed location on the cloth-like part that divides the cloth-like part to an upper piece and lower piece due to the expansion pressure of the cushion. If the cushion expands and deploys with the occupant in close proximity, the upper piece of the cloth-like part is sandwiched in between the cushion and the occupant, such that the upper piece restrains the upward deployment of the cushion.

14 Claims, 13 Drawing Sheets

(51) Int. Cl.
*B60R 21/2165* (2011.01)
*B60R 21/215* (2011.01)

(56) References Cited

U.S. PATENT DOCUMENTS

| | | | | |
|---|---|---|---|---|
| 8,408,596 | B2* | 4/2013 | Matsunaga | B60R 21/205 280/743.1 |
| 8,419,048 | B2* | 4/2013 | Yamaji | B60R 21/205 280/728.3 |
| 8,485,553 | B1* | 7/2013 | Kuhne | B60R 21/205 280/743.2 |
| 9,682,678 | B2* | 6/2017 | Rose | B60R 21/201 |
| 10,173,630 | B2* | 1/2019 | Minami | B60R 21/201 |
| 2005/0206133 | A1* | 9/2005 | Hochstein-Lenzen | B60R 21/2176 280/728.2 |
| 2007/0007757 | A1* | 1/2007 | Bauer | B60R 21/20 280/743.2 |
| 2009/0152842 | A1* | 6/2009 | Benny | B60R 21/201 280/728.3 |
| 2009/0295135 | A1* | 12/2009 | Kumagai | B60R 21/2338 280/743.1 |
| 2009/0295136 | A1* | 12/2009 | Kumagai | B60R 21/231 280/743.1 |
| 2017/0120853 | A1* | 5/2017 | Rose | B60R 21/201 |
| 2018/0037185 | A1* | 2/2018 | Minami | B60R 21/2334 |
| 2018/0099637 | A1* | 4/2018 | Choi | B60R 21/237 |
| 2020/0130631 | A1* | 4/2020 | Fischer | B60R 21/205 |

FOREIGN PATENT DOCUMENTS

| | | | | |
|---|---|---|---|---|
| EP | 3939859 | A1 * | 1/2022 | B60R 21/2035 |
| JP | 2009-286339 | A | 12/2009 | |
| JP | 2009-286340 | A | 12/2009 | |
| JP | 2010-132256 | A | 6/2010 | |
| JP | 2010-235044 | A | 10/2010 | |
| JP | 2011-68184 | A | 4/2011 | |
| JP | 2012-148628 | A | 8/2012 | |
| KR | 100699173 | B1 * | 12/2005 | |
| WO | WO-2006003748 | A1 * | 1/2006 | B60R 21/201 |
| WO | WO-2015111255 | A1 * | 7/2015 | B60R 21/201 |
| WO | WO-2020184167 | A1 * | 9/2020 | B60R 21/2035 |

* cited by examiner

A-A

| Sample | A | B | C | D |
|---|---|---|---|---|
| Dimensions | 250 mm | 220 mm | 190 mm | 170 mm |
| Deployment judgment | × | ○ | ○ | ○ |
| OOP judgment | ○ | ○ | ○ | × |

AIRBAG HOLDING COVER AND VEHICLE AIRBAG DEVICE

TECHNICAL FIELD

The present invention relates to an airbag retaining cover that encases an airbag cushion and a vehicle airbag device including this airbag retaining cover.

BACKGROUND TECHNOLOGY

Currently, nearly all vehicle steering wheels are equipped with an airbag device. The airbag cushion of the airbag device is primarily stowed in the central hub of the steering wheel, and expands and deploys in front of the occupant by cleaving a resin cover member or the like by the expansion pressure thereof.

Normally, the shape and installation location of an airbag cushion is determined based on the assumption that the occupant is seated in the seat in a normal posture. However, the occupant may not always be in a normal seating position, for example, when the occupant unexpectedly leans forward. When the occupant is in a non-normal seating position relative to the seat (commonly known as out-of-position), the airbag cushion may contact the head of the occupant from below in the unlikely event of an emergency situation. In this case, the airbag cushion will cause the head of the occupant to retroflex backwards. Due to the structure of the human body, it is known that movements that rotate the head, such as retroflexing backwards, tend to place a burden on the body.

As a countermeasure for the above out-of-position, for example, in Patent Document 1, a rearwardly tilting flap 15 is provided in an airbag 10. The rearwardly tilting flap 15 is described as having the function of suppressing the rearwardly tilting moment of the head when the airbag 10 starts to expand and deploy in close proximity to the head of the occupant that is out-of-position (paragraph 0040).

PRIOR ART DOCUMENTS

Patent Documents

[Patent Document 1] Japanese Unexamined Patent Application No. 2011-68184

SUMMARY OF THE INVENTION

However, as illustrated in FIG. 4 of Patent Document 1, the backward tilting flap 15 is a long band-shaped member, and may shift from the initially set position due to vibration during stowage or momentum when the airbag 10 expands and deploys. In order to increase the safety of the airbag 10 by means of the rearward tilting flap 15, the rearward tilting flap 15 must be properly deployed in the desired position.

Problem to be Solved by the Invention

In light of these issues, an object of the present invention is to provide an airbag retaining cover and a vehicle airbag device that can improve safety during the expansion and deployment of the airbag cushion.

Means for Solving the Problems

In order to solve the problem described above, a typical configuration of the airbag retaining cover of the present invention is an airbag retaining cover that encapsulates an airbag cushion that is stowed in a stowable stowed form in front of the regular seating position in a vehicle. The airbag retaining cover has a side surface retaining part that encapsulates around the side of the airbag cushion in the retracted form, a cloth-like part that traverses the upper surface of the airbag cushion in the retracted form vertically, and a weak part that is provided at a predetermined point on the cloth-like part and breaks under the expansion pressure of the airbag cushion to divide the cloth-like part vertically into an upper piece and a lower piece. When the airbag cushion expands and unfolds with the occupant in close proximity thereto, the upper piece of the cloth-like part is sandwiched between the airbag cushion and the occupant, and the upper piece of the cloth-like part suppresses the upward expansion of the airbag cushion.

The airbag retaining cover allows the upper piece of cloth-like part to be efficiently applied to the upper part of the airbag cushion when the airbag cushion is expanding and deploying. When the occupant is leaning forward, the upper piece of cloth-like part is sandwiched between the airbag cushion and the occupant during deployment, and resists the airbag cushion's attempt to expand from below. This enables preventing the airbag cushion from contacting the head from below, or to suppress the load when the airbag cushion contacts the head from below, thus achieving prevention of pushing up and retroflexing of the head. In addition, the airbag retaining cover enables retaining the airbag cushion in the stowed form thereof, making the airbag cushion easier to handle, such as transporting the airbag cushion before vehicle assembly.

The upper end of the above cloth-like part should be connected to the side surface retaining part above the airbag cushion. This configuration allows the upper piece of cloth-like part to be appropriately stretched over the expanding and deploying airbag cushion.

The lower end of the cloth-like part described above may be inserted between the side surface retaining part and the airbag cushion. The fact that the cloth-like part is inserted between the side surface retaining part and the airbag cushion allows for smoother deployment than when the cloth-like part is sandwiched between the airbag cushion and housing.

The lower end of the cloth-like part described above may be connected to the side surface retaining part. This configuration allows the cloth-like part to be draped over the airbag cushion in a favorable vertical position.

The weak part described above may be provided overlapping the lower part of the airbag cushion in stowed form. This configuration makes it easier to rupture the weak part using the expansion pressure of the airbag cushion. The weak part described above may be located near the bottom edge of the cloth-like part. This configuration allows the upper piece of cloth-like part to be formed longer, simplifying application of the upper piece to the expanding and deploying airbag cushion.

The coefficient of static friction of the surface on the opposite side of the airbag cushion of the above cloth-like part is recommended to be higher than the coefficient of static friction of the surface on the airbag cushion side. This configuration increases the static frictional force between the cloth-like part and the occupant, which prevents the cloth-like part from sliding off the occupant and allows the airbag cushion to fully restrain the occupant while allowing the cloth-like part to function properly.

A prescribed resin may be applied to the surface on the opposite side of the airbag cushion of the cloth-like part described above. This configuration enables increasing the static frictional force between the cloth-like part and the occupant.

The coefficient of static friction of the side surface retaining part is recommended to be lower than the coefficient of static friction of the inner surface of the housing stowing the airbag cushion in stowed form. This configuration enables smooth deploying of the cloth-like part.

The side surface retaining part may be formed from the same material as the airbag cushion. This configuration allows the coefficient of static friction of the side surface retaining part to be the same as that of the airbag cushion, allowing the cloth-like part to deploy smoothly.

The weak part as described above may include a slit to break the cloth-like part by the expansion pressure of the airbag cushion, a temporary sewed seam to connect the cloth-like part to the side surface retaining part to be broken by the expansion pressure of the airbag cushion, or a heat weld to connect the cloth-like part to the side surface retaining part to be disintegrated by the expansion pressure of the airbag cushion.

According to each of the weak parts described above, the cloth-like part can be split during the expansion and deployment of the airbag cushion to form upper and lower pieces thereof.

The airbag cushion in a stowed form as described above may be stowed in the steering wheel in front of the regular seating position of the driver seat. This configuration enables the driver seat occupant to be protected advantageously.

The airbag cushion in the stowed form described above may be stowed in the upper part of the instrument panel in front of the regular seating position of the passenger seat. This configuration enables suitable protection for the occupant in the passenger seat.

In order to solve the above problem, a typical configuration of the vehicle airbag device of the present invention is to provide an airbag cushion stowed in a bulky stowed form in front of the regular seating position in the vehicle, an inflator built into the airbag cushion, and an airbag retaining cover.

Effect of the Invention

The present invention enables providing an airbag retaining cover and a vehicle airbag device that can improve safety during the expansion and deployment of the airbag cushion.

MODE FOR CARRYING OUT THE INVENTION

Figure 1A:
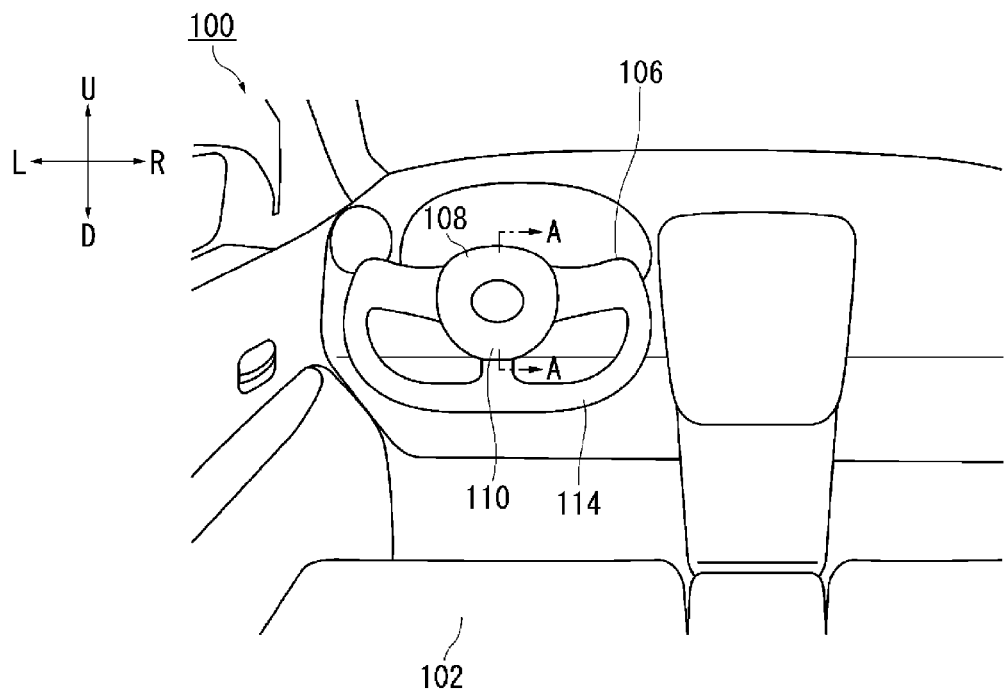
FIG. 1 is a diagram illustrating an overview of a vehicle airbag device equipped with an airbag retaining cover according to an embodiment of the present invention.

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

FIG. 1 is a diagram illustrating an overview of a vehicle airbag device 100 equipped with an airbag retaining cover (hereinafter referred to as the retaining cover 130) according to an embodiment of the present invention. FIG. 1 (a) is a diagram illustrating a state of the vehicle airbag device 100 before activation. Hereinafter, regarding FIG. 1 and other diagrams, a vehicle front-rear direction is illustrated by the symbols F (Front) and B (Back), a vehicle width direction of the vehicle by the symbols L (Left) and R (Right), and a vehicle up-down direction by the symbols U (Up) and D (Down).

The vehicle airbag device 100 is applied in the present embodiment as the driver airbag for the driver's seat for vehicles with a steering wheel on a left side (front row left side seat 102). Hereinafter, descriptions are made assuming the front row left side seat 102, for example, the outer side of the vehicle (hereinafter, outer vehicle side) refers to the left side of the vehicle, and the inner side of the vehicle (hereinafter, inner vehicle side) refers to the right side of the vehicle.

The airbag cushion (hereinafter, referred to as cushion 104 (see FIG. 1(b)) of the vehicle airbag device 100 is stowed in a folded or rolled condition or the like in front of a seating position of the seat 102, inside a central hub 108 of a steering wheel 106. At this time, the cushion 104 is stowed together with an inflator 112 (see FIG. 2(a)) that supplies the gas, forming an airbag module 105.

The steering wheel 106 on which the cushion 104 is installed in the present embodiment is assumed to be of a configuration in which operation of the occupant is converted into an electrical signal and transmitted to the wheel. Since the steering wheel 106, which performs the conversion to electrical signals, does not need to rotate the rim 114 at a large angle, the rim is shaped to be present only on the left, right, and below the hub 108.

FIG. 1 (b) is a diagram illustrating a state of the vehicle airbag device 100 after activation. The cushion 104 begins to expand based on gas from the inflator 112 (see FIG. 2 (a)), opening a cover member 110 of the steering wheel 106 (see FIG. 1 (a)). The cushion 104 expands and deploys in a bag-like shape in front of the regular seating position in the seat 102 to restrain the upper body and head of the occupant moving forward. The cushion 104 has a circular shape as viewed from the seating position side, and is formed by overlaying a plurality of panels that form the surface thereof and then stitching or adhering.

The cushion 104 of the present embodiment is covered with the cloth-like part 134 of the retaining cover 130 (described below). The cloth-like part 134 is a member for preventing the head of the occupant from bending backward (see FIG. 8).

Figure 1B:
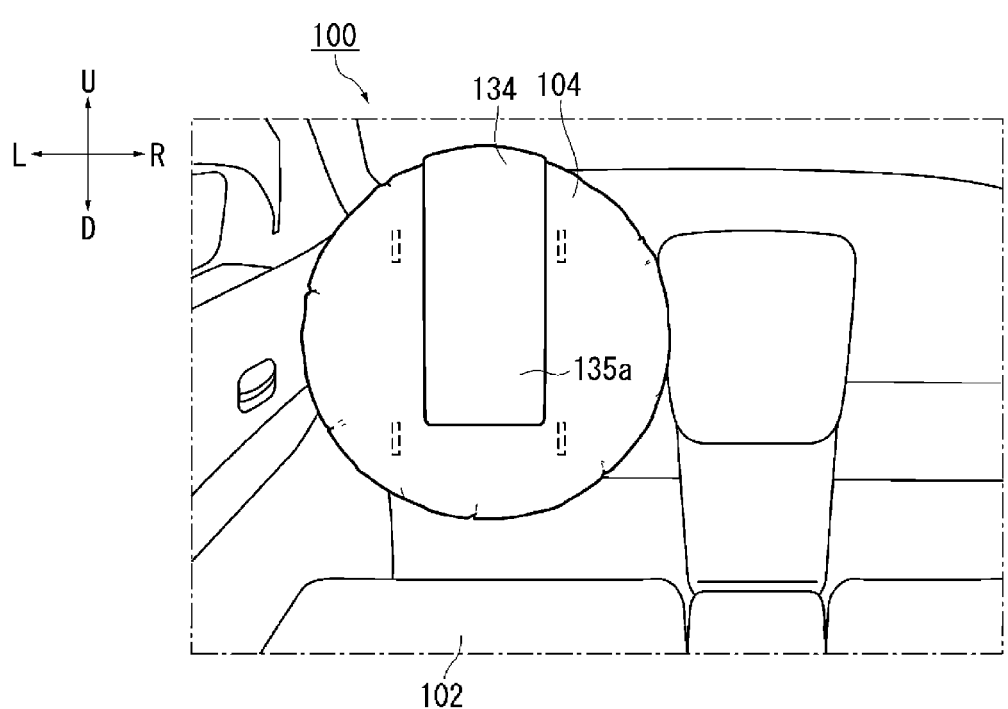
Figure 2A:
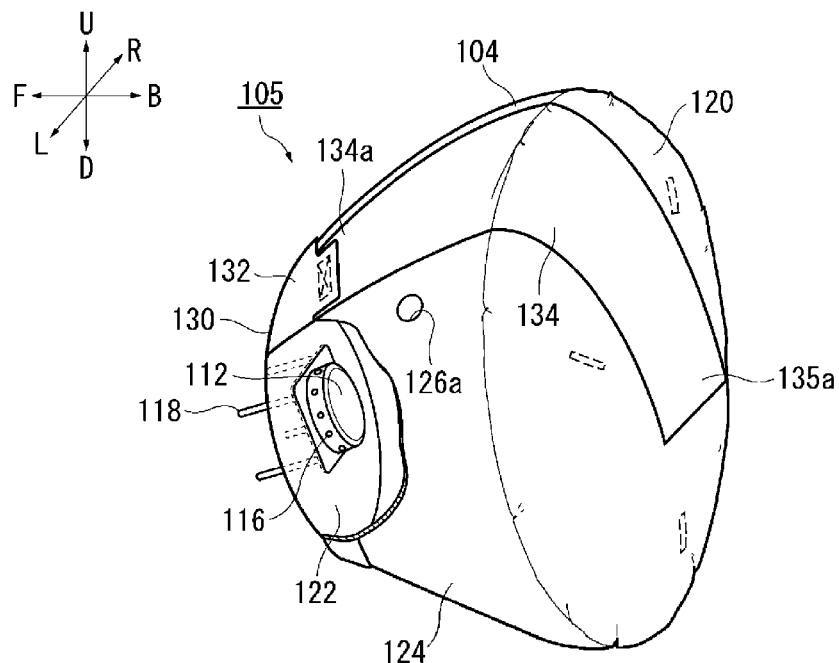
FIG. 2 is a diagram illustrating the airbag module in FIG. 1(b) in an activated state from various directions.

FIG. 2 is a diagram illustrating the airbag module 105 in FIG. 1(b) in an activated state from various directions. FIG. 2 (a) illustrates the airbag module 105 of FIG. 1 (b) viewed from slightly above the exterior of the vehicle. In FIG. 2(a), a portion of the panel configuring the cushion 104 is cut out to expose the internal inflator 112. The cushion 104 in the present embodiment has a shape similar to a truncated cone, with the diameter widening from the steering wheel 106 side (see FIG. 1(a)) toward the occupant side (vehicle rear side).

The cushion 104 is formed from a plurality of panels, including a front panel 120, a rear panel 122 on the steering wheel 106 (see FIG. 1(a)) side, and a side panel 124 forming the side parts. The side panels 124 are also provided with vent holes 126a and 126b for discharging gas to the outside.

The inflator 112 is a device for supplying gas, and in the present embodiment, a disk type is used. The inflator 112, where a portion thereof formed with a gas discharge port 116 is inserted into the cushion 104 through a rear panel 122, is activated based on an impact detection signal transmitted from a sensor (not shown) to supply gas to the cushion 104.

The inflator 112 is provided with a plurality of stud bolts 118. The stud bolts 118 pass through the rear panel 122 of the cushion 104 and are fastened to the inner bottom surface of the steering wheel 106. By fastening the stud bolts 118, the cushion 104 is secured to the steering wheel 106.

Examples of currently prevailing inflators include: types which are filled with a gas generating agent and burn the agent to generate gas; types which are filled with compressed gas and supply gas without generating heat; hybrid types which utilize both combustion gas and compressed gas; and the like. Any of these types of inflators can be used as the inflator 112.

The cloth-like part 134 is a part of the retaining cover 130 that encases the cushion 104. The cloth-like part 134 is a long strip, and both ends thereof are connected to the side surface retaining part 132. The cloth-like part 134 is broken in the middle as the cushion 104 expands and develops, broken into an upper piece 135a on the upper end side (see FIG. 6(d)) and a lower piece 135b on the lower end side. Furthermore, the upper piece 135a is passed over the upper part of the expanded and deployed cushion 104 in the vehicle front-rear direction and vehicle vertical direction.

Figures 2B, 2C:
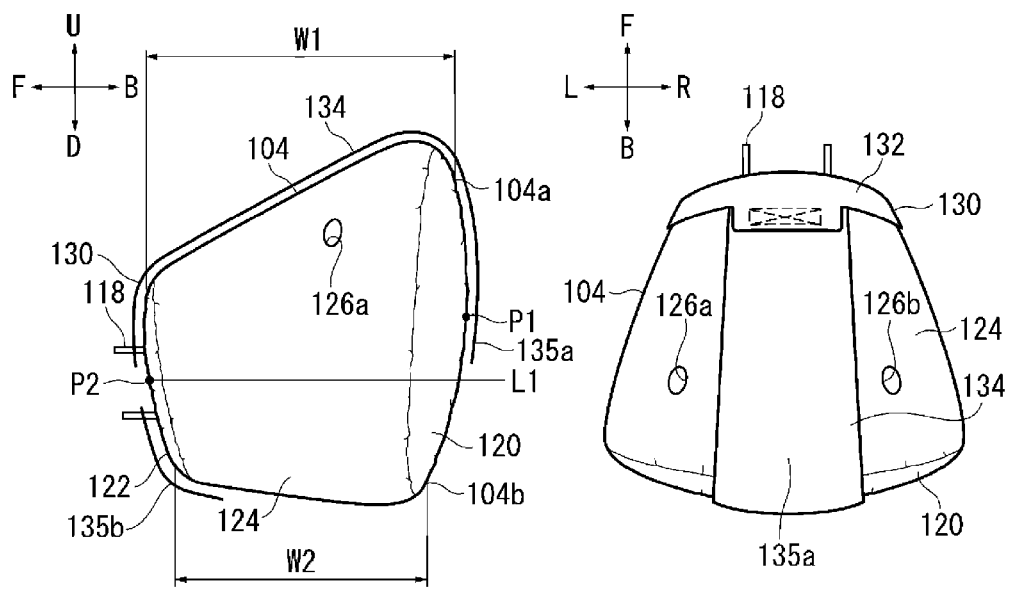

FIG. 2(b) illustrates the airbag module 105 of FIG. 2(a) from the left side in the vehicle width direction. The shape is inclined such that a center P1 of the front panel 120 in a height direction is positioned above an imaginary line L1 horizontally extended from a center P2 of the rear panel 122 in the height direction. When the cushion 104 is expanded and deployed, the front panel 120 is arranged to extend substantially vertically, while the rear panel 122 is arranged so that the upper portion thereof is inclined to collapse to the vehicle front side (left side in FIG. 2(b)). As a result, in the vehicle front-rear direction, the width W1 of an upper portion 104a of the expanded and deployed cushion 104 is thicker than the width W2 of a lower portion 104b of the cushion 104.

FIG. 2(c) illustrates the airbag module 105 of FIG. 2(a) from above. The cushion 104 is in the shape of an essentially symmetrical truncated cone when viewed from above. The upper piece 135a of the cloth-like part 134 is configured to be passed over the upper end surface of the cushion 104 in the center of the vehicle width direction in the vehicle front-rear direction.

Figure 3A:
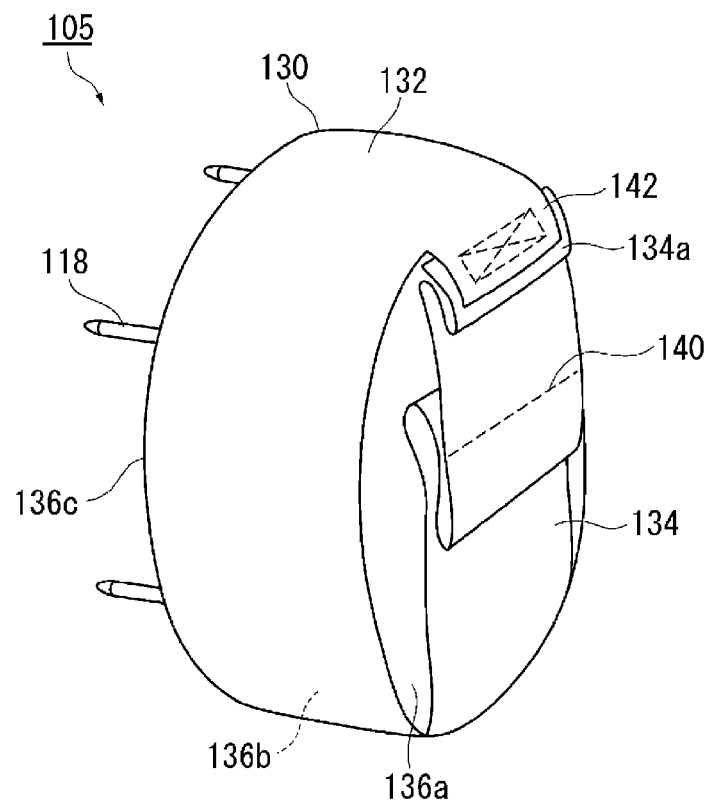
FIG. 3 is a diagram illustrating the airbag module in FIG. 2(a) in a state before activation.

FIG. 3 is a diagram illustrating the airbag module 105 in FIG. 2(a) in a state before activation. FIG. 3(a) is a perspective view of the airbag module 105 before activation, illustrated from the same direction as FIG. 2(a). Regarding the pre-activated airbag module 105, the cushion 104 before expansion and deployment is stowed in bulk form by encapsulating or folding into a small shape, after encapsulating the inflator 112 (see FIG. 2(a)).

The cushion 104 in a stowed form is encapsulated by the retaining cover 130 to maintain being folded and the like. By encapsulating the cushion 104 with the retaining cover 130, the cushion 104 can be prevented from being folded or otherwise disrupted, making the airbag module 105 easier to transport as well as easier to assemble into a vehicle.

The side surface retaining part 132 of the retaining cover 130 encapsulates the side surface 136b of the stowed form cushion 104. The side surface retaining part 132 retains the cushion 104 encapsulating around the side surface 136b of the cushion 104 in a state where the upper surface 136a of the cushion 104 in stowed form is opened. Note that the side surface 136b of the cushion 104 refers to the surface of the side part of a bulk-shaped cushion 104 wherein the exposed stud bolts 118 of the inflator 112 (see FIG. 2(a)) face the lower surface 136c, and the opposite side thereof is the upper surface 136a.

The cloth-like part 134 is a strip that breaks when the cushion 104 is expanded and deployed. The cloth-like part 134 before deployment spans over the upper surface 136a of the cushion 104 in the vertical direction, and both ends thereof are connected to the side surface retaining part 132. When the airbag module 105 is installed in the steering wheel 106 (see FIG. 6(a)), the cloth-like part 134 is passed over the side surface retaining part 132, traversing the upper surface 136a of the cushion 104.

Figure 3B:
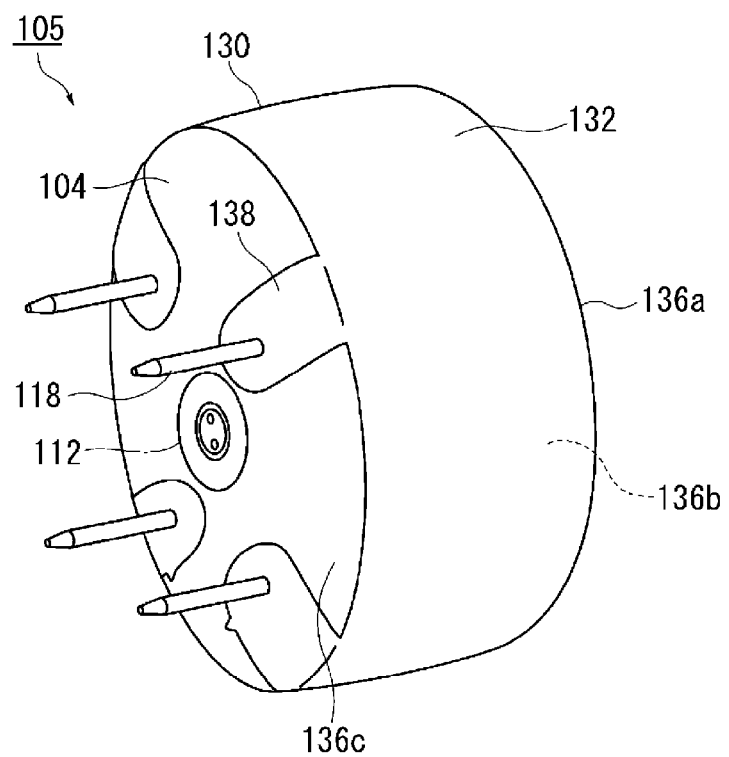

FIG. 3(b) is a perspective view illustrating the opposite side of the cushion 104 of the stowed form in FIG. 3(a). The side surface retaining part 132 has four tabs 138 that hook onto the stud bolts 181 that extend from the inflator 112. The retaining cover 130 is kept in place by passing the stud bolts 118 through the tabs 138 to retain the cushion 104 in an encapsulated state.

Figure 4A:
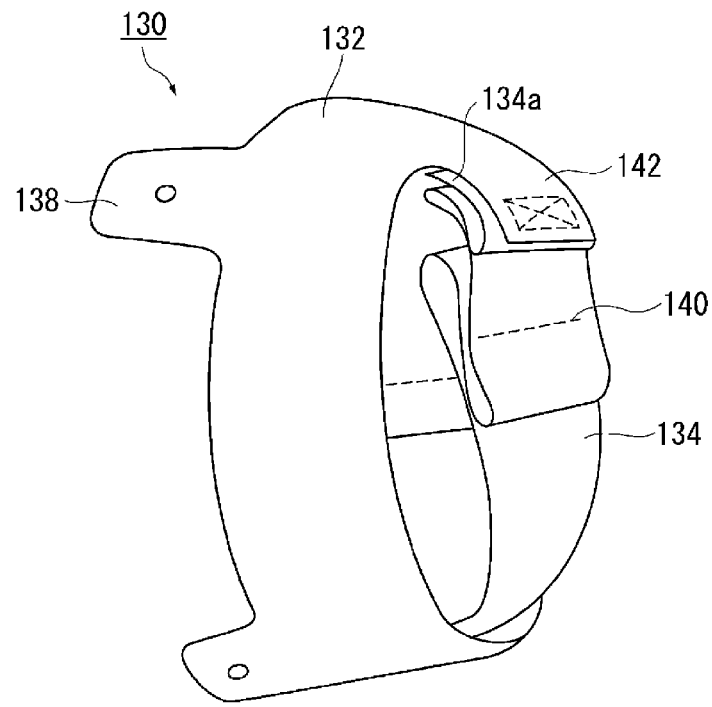
FIG. 4 is a diagram illustrating the retaining cover in FIG. 3(a) by itself.

FIG. 4 is a diagram illustrating the retaining cover 130 in FIG. 3(a) separately. FIG. 4(a) illustrates the retaining cover 130 from the same direction as FIG. 3(a). The cloth-like part 134 is folded a plurality of times in the middle in the longitudinal direction and passed over the side surface retaining part 132. The sewed seam 140 that maintains the folding of the cloth-like part 134 can be broken or otherwise disintegrated by the pressure during the expansion and deployment of the cushion 104.

Figure 4B:
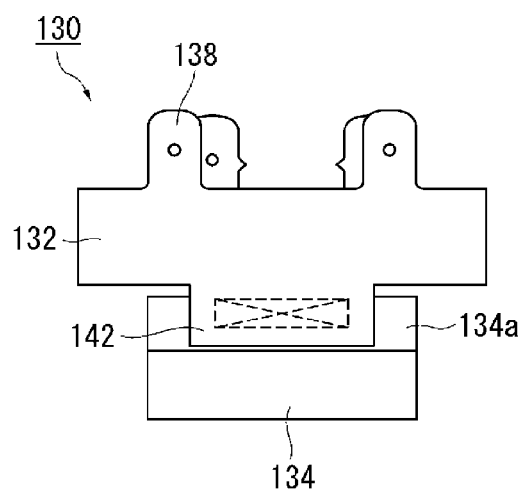
Figure 4C:
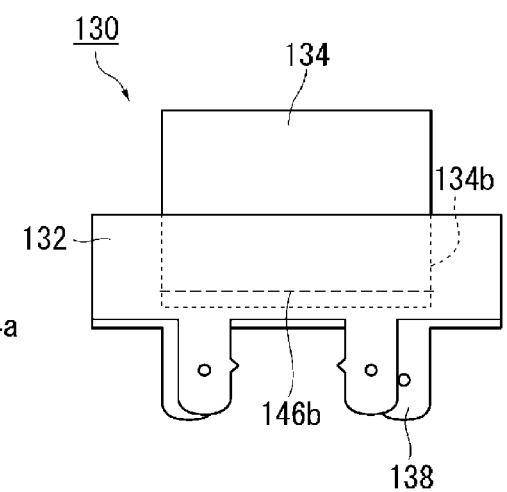

FIG. 4(b) illustrates the retaining cover 130 of FIG. 4(a) from above. The protruding piece 142 of the side surface retaining part 132 is sewn over the top of the upper end side 134a of the cloth-like part 134. FIG. 4(c) illustrates the retaining cover 130 of FIG. 4(a) from below. The lower end side 134b of the cloth-like part 134 is connected to the side surface retaining part 132 from the lower side of the annular side surface retaining part 132 by sewing (connecting part 146b).

Figure 5:
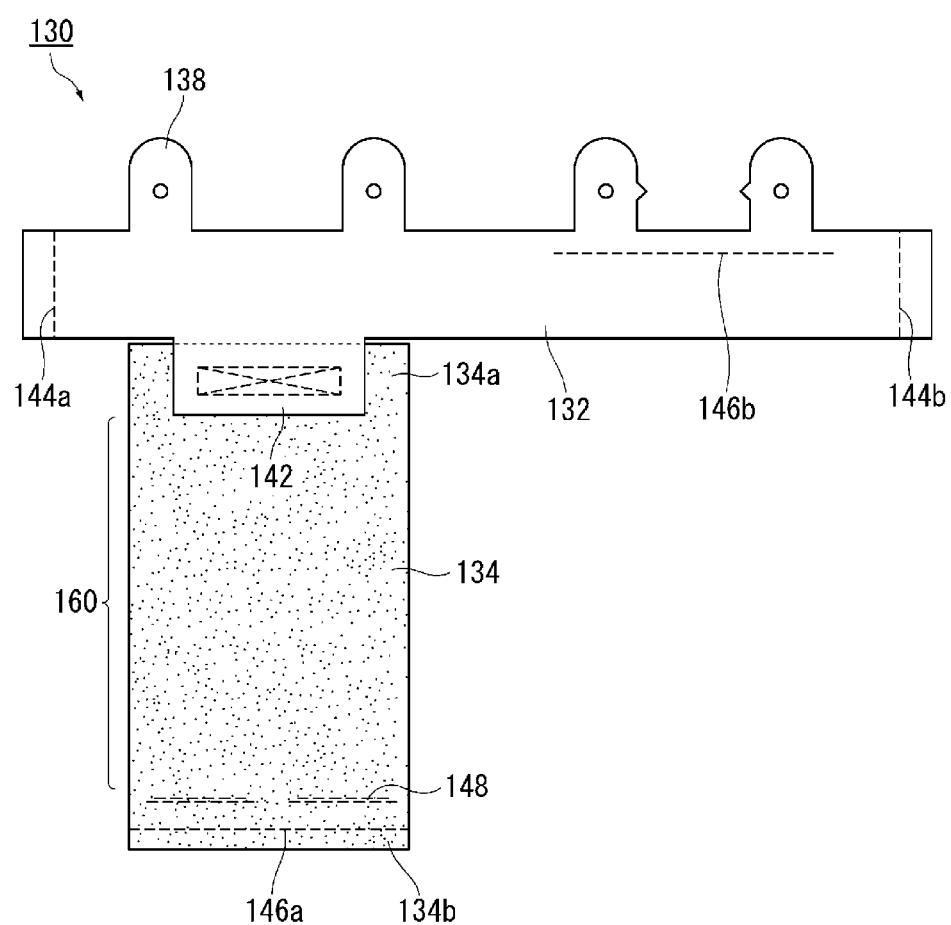
FIG. 5 is a diagram of the retaining cover in FIG. 4(a) unfolded on a flat surface.

FIG. 5 is a diagram of the retaining cover 130 in FIG. 4(a) unfolded on a flat surface. The side surface retaining part 132 is a strip with four tabs 138 and is connected at both ends by connecting parts 144a and 144b (see FIG. 4(a)), generating a ring shape configuration. The cloth-like part 134 is also strip-like, with the upper end side 134a being connected to the protruding piece 142 of the side surface retaining part 132 and the connecting part 146a of the lower end side 134b being connected to the connecting part 146b of the side surface retaining part 132. The side surface retaining part 132 and the cloth-like part 134 can be made of the same material as the base fabric of the cushion 104.

Of the lower end side 134b of the cloth-like part 134, a weak part 148 is provided in the vicinity of the connecting part 146a. The weak part 148 is formed as a dashed slit in this embodiment. The weak part 148 is subjected to the expansion pressure of the cushion 104 (see FIG. 6(c)), breaking and splitting the cloth-like part 134 into an upper piece 135a and lower piece 135b.

Note that in addition to a slit, the weak part 148 can be a variety of forms, including a temporary seam connecting the cloth-like part 134 and side surface retaining part 132 that is breakable due to the expansion pressure of the cushion 104, or a heat weld connecting the cloth-like part 134 and side surface retaining part 132 that can be disintegrated by the expansion pressure of the cushion 104. Each of these weak parts also allows the cloth-like part 134 to be divided into upper and lower parts when the cushion 104 is expanded and deployed, forming the upper piece 135a and the lower piece 135b.

FIG. 6 is a diagram illustrating the activation process of the airbag module 105 in FIG. 3(a). FIG. 6(a) corresponds to the A-A cross section in FIG. 1(a). As illustrated in FIG. 6(a), the airbag module 105 is stowed inside the cover member 110 of the steering wheel 106. As illustrated in FIG. 6(b), when gas is supplied from the inflator 112 to the cushion 104, the expansion pressure of the cushion 104 causes the cover member 110 to open.

Figure 6A:
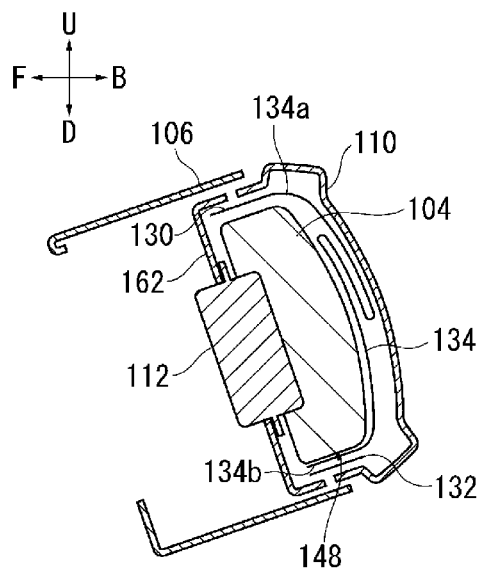
FIG. 6 is a diagram illustrating the activation process of the airbag module in FIG. 3(a).
Figure 6B:
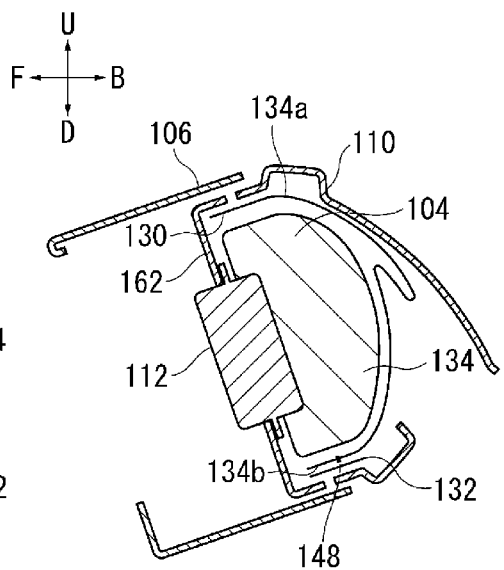
Figure 6C:
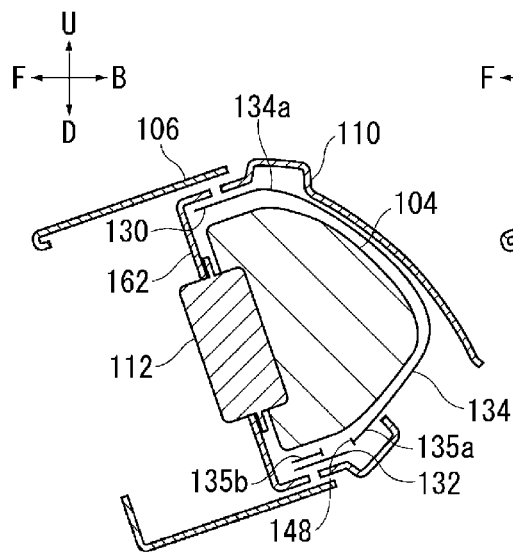
Figure 6D:
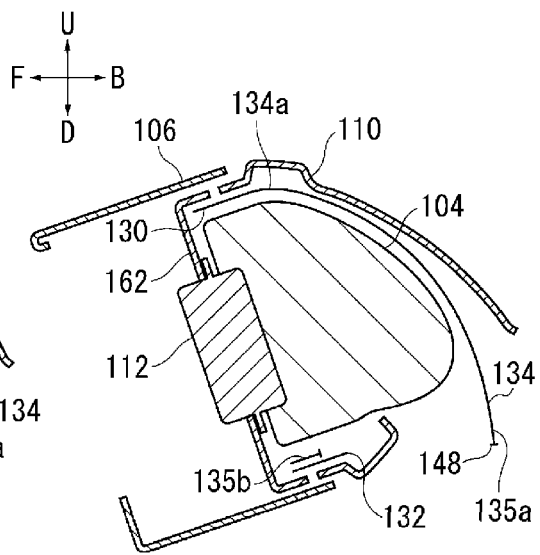

As illustrated in FIG. 6(c), when the cushion 104 expands and deploys, the weak part 148 of the cloth-like part 134 breaks due to the expansion pressure of the cushion 104, and the cloth-like part 134 becomes divided into an upper piece 135a and lower piece 135b. Then, as illustrated in FIG. 6(d), the upper piece 135a of the cloth-like part 134 covers the cushion 104, and the cushion 104 expands and deploys outward covered by the upper piece 135a.

Figure 7:
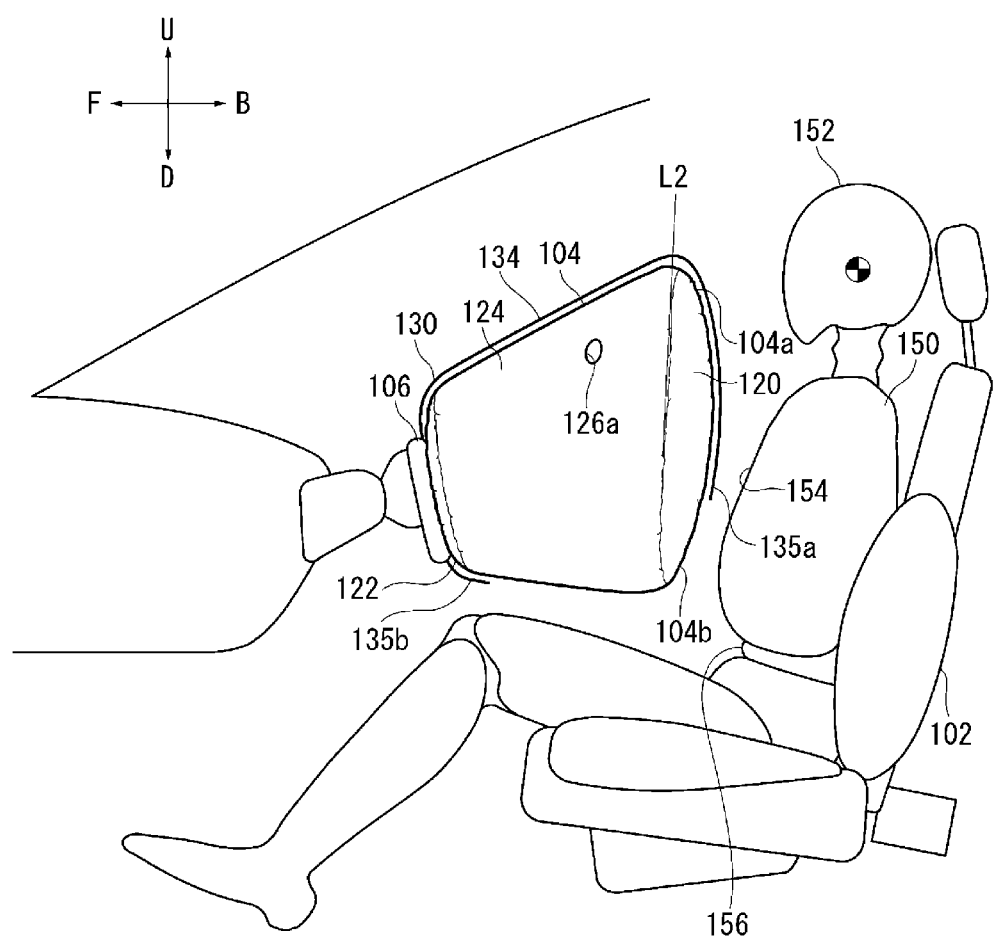
FIG. 7 is a diagram illustrating the cushion in FIG. 2(b) and an occupant in a normal seating position.

FIG. 7 is a diagram illustrating the cushion 104 of FIG. 2(b) and the occupant 150 in a normal seating position. FIG. 7 illustrates an occupant 150 normally seated in the cushion 104 and seat 102 as viewed from the left side in the vehicle width direction. The cushion 104 can restrain the occupant 150 from the head 152 to chest 154, and to the abdomen 156 thereof, with the occupant side front panel 120 as the primary restraining surface.

As described with reference to FIG. 2(b), the upper portion 104a of the expanded and deployed cushion 104 is configured to be thicker in the vehicle front-rear direction than the lower portion 104b of the cushion 104. In particular, the expanded and deployed cushion 104 is installed in an orientation whereas a boundary L2 between the side panel 124 and the front panel 120 extends upwardly when viewed from the vehicle width direction. In an emergency, the occupant 150 attempting to move forward in the vehicle will make contact at an early stage from the upper portion 104a of the cushion 104. With the thickness thereof, the upper portion 104a of the cushion 104 absorbs a load from the head 152 of the occupant 150.

As described with reference to FIG. 2(b), the width W2 in the vehicle front-rear direction of the lower portion 104b of the cushion 104 is slightly smaller than the width W1 of the upper portion 104a. In a general vehicle, a steering wheel is inclined at an angle of approximately 20° to 25° to the vehicle front side, and space between the steering wheel and the occupant 150 narrows in the vehicle front-rear direction toward a lower chest 154 side. With the cushion 104 of the present example, the width in the vehicle front-rear direction decreases as the cushion moves toward the lower portion 104b, and therefore, the lower portion 104b easily enters the narrow space between the steering wheel 106 and the abdomen 142.

Figure 8A:
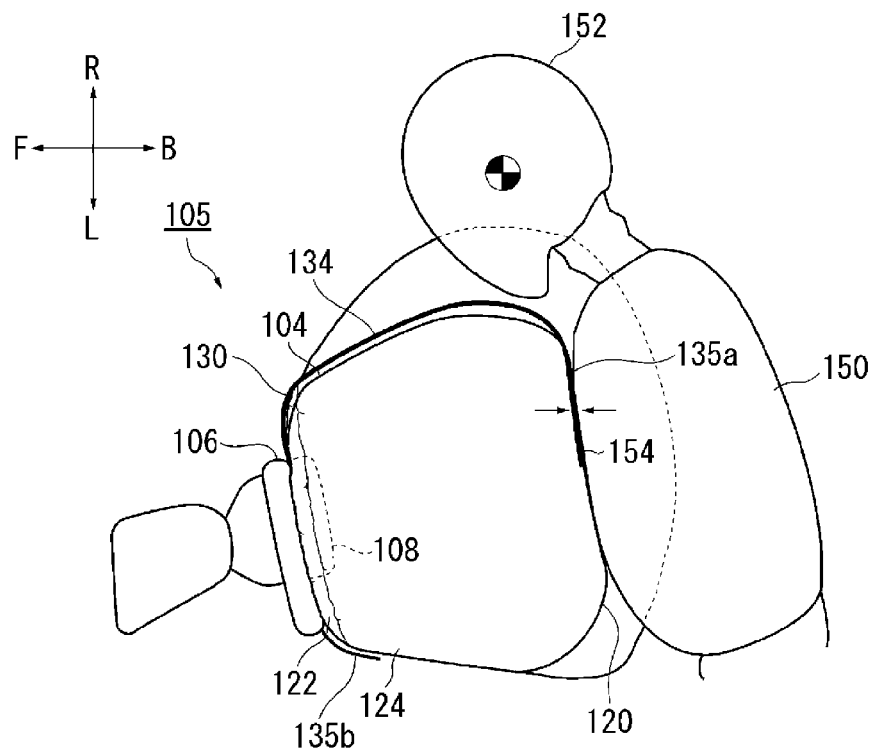
FIG. 8 is a diagram illustrating the cushion in FIG. 7 and an occupant in a non-normal seating position.

FIG. 8 is a diagram illustrating the cushion 104 in FIG. 7 and the occupant 150 in a non-normal seating position. FIG. 8(a) illustrates the occupant 150 in a non-normal seating position (commonly referred to as out-of-position) relative to the cushion 104 and seat 102 (see FIG. 7), viewed from the left in the vehicle width direction.

For example, if the occupant 150 is leaning forward from the seat 102 (see FIG. 7), when the cushion 104 begins to expand and deploy and in a state where the occupant 150 is near the cushion 104, the cushion 104 may approach the head of the occupant 150 from below. At this time, in the present embodiment, the upper piece 135a of the cloth-like part 134 of the retaining cover 130 is passed over the upper part of the cushion 104, such that the occupant 150 makes direct contact with the upper piece 135a of the cloth-like part 134. The upper piece 135a of the cloth-like part 134 becomes sandwiched between the cushion 104 and the chest of the occupant 150, restraining the cushion 104 expanding and deploying from below.

Figure 8B:
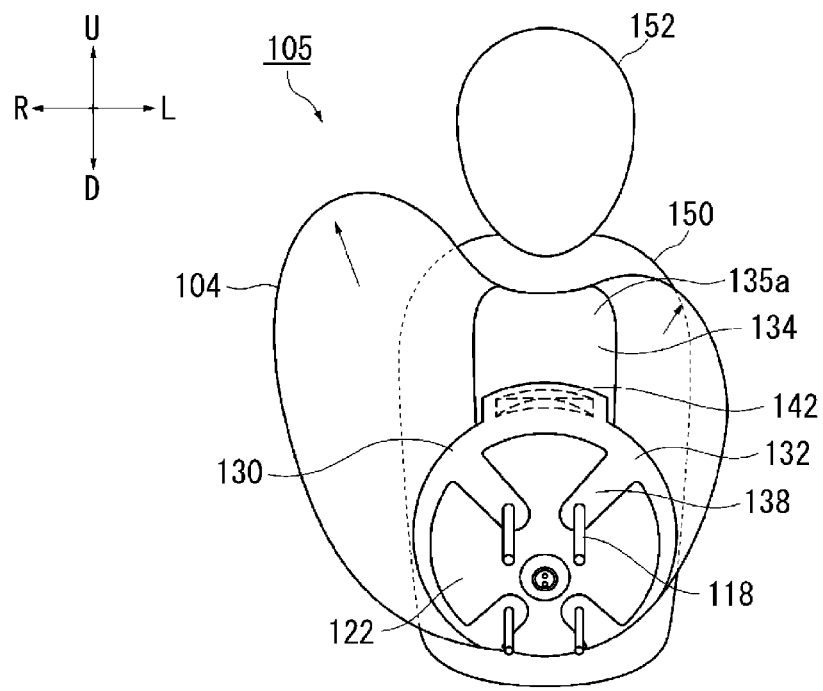

FIG. 8(b) is a diagram of the airbag module 105 and the occupant 150 in FIG. 8(b) as viewed from the front of the vehicle. As described above, the upper piece 135a of the cloth-like part 134 is sandwiched between the occupant 150 and the cushion 104, making it difficult for the cloth-like part to move and causing the cloth-like part to press downwardly on the cushion 104. This prevents the cushion 104 from expanding and deploying upward, for example, by avoiding the cloth-like part 134 to the left and right.

According to the configuration described above, the deployment behavior of the cushion 104 toward the head 152 of the occupant 150 can be suppressed, or the load when the cushion 104 contacts the head 152 can be suppressed, preventing the head 152 from being pushed up and retroflexed backward.

In particular, as described with reference to FIG. 6, the cushion 104 is a retaining cover having a cloth-like part 134 that is encapsulated and stowed in the retaining cover 130. Also, the retaining cover 130 does not fall off of the cushion 104 even after the cushion 104 expands and deploys. Accordingly, the present embodiment prevents misalignment of the cloth-like part 134 both while stowed and during expansion and deployment of the cushion 104, and enables efficient deployment of the cloth-like part 134 at a desired position, or in other words, between the cushion 104 in the process of deployment and the head 152 to the chest 154 of the occupant 150.

The cloth-like part 134 functions primarily when the cushion 104 starts to expand and deploy in proximity to the occupant 150 (see FIG. 8(a)) in a non-normal seating position, in other words, during the expansion and deployment of the cushion 104. For example, if the occupant 150 is present in a normal seating position (FIG. 7) and there is distance between the cushion 104 and the occupant 150, the cushion 104 will have completed expansion and deployment and will be greatly inflated. In that state, the upper piece 135a of the cloth-like part 134 may not be draped over the front panel 120.

The cloth-like part 134 of the present embodiment is designed such that the surface on the occupant 150 side has a higher coefficient of static friction than the surface on the cushion 104 side in order to simplify sandwiching of the upper piece 135a between the occupant 150 and the cushion 104. For example, the cloth-like part 134 in FIG. 5 has a resin-coated surface 160 on the occupant 150 side. The resin-coated surface 160 is coated with silicone (as an example of a type of resin), and has a large static frictional force against the occupant 150 (FIG. 8(a)), causing slipping against the occupant 150 to occur less readily. Accordingly, with the airbag module 105, when the upper piece 135a of the cloth-like part 134 contacts the occupant 150, the upper piece 135a and the cushion 104 are prevented from slipping off the occupant 150, and the upper piece 135a of the cloth-like part 134 appropriately exerts the function of preventing the head 152 of the occupant 150 from being pushed up, while enabling the cushion 104 to fully restrain the occupant 104 [sic].

The resin-coated surface 160 of the cloth-like part 134 can be formed by urethane rubber or other resin films, in addition to silicon.

As illustrated in FIG. 6(a), the upper end 134a of the cloth-like part 134 is connected to the side surface retaining part 132 above the cushion 104 (see FIG. 5). This configuration allows the upper piece 135a of the cloth-like part 134 to be appropriately passed over the expanding and deploying cushion 104.

The lower end side 134b of the cloth-like part 134 is connected to the side surface retaining part 132 in a state inserted between the side surface retaining part 132 and the cushion 104. The coefficient of static friction of the side surface retaining part 132 is set lower than the coefficient of static friction of the inner surface of the housing 162 where cushion 104 is stowed. For example, the side surface retaining part 132 is formed from the same material as the cushion 104 and is set to around the same coefficient of static friction of the cushion 104. Accordingly, as the cloth-like part 134 is inserted between the side surface retaining part 132 and the cushion 104, even if the coefficient of static friction of the cloth-like part 134 is set higher, the cloth-like part 134 is still able to deploy more smoothly rather than a case where the cloth-like part 134 is sandwiched between the cushion 104 and the housing 162.

As described above, encapsulating the cushion 104 with the retaining cover 130 can prevent the cushion 104 from retroflexing the head 152 of the occupant 150 backward (see FIG. 8(a)) during expansion and deployment, improving the safety of the cushion 104. In addition, enveloping the cushion 104 with the side surface retaining part 132 of the retaining cover 130 can regulate the deployment behavior of the cushion 104 in a desired direction, thereby improving the deployment accuracy of the cushion 104 and preventing deformation of the housing 162. The retaining cover 130 can be formed from a base fabric of the same material as the cushion 104, but the cover can also be formed from other materials as long as the coefficient of static friction is the same as the cushion 104.

Modified Example

Modified examples of each of the above-described components are described below. In each of the diagrams FIG. 9 to FIG. 11, the same sign is attached to the same elements as those already described, and descriptions of the previously mentioned elements are omitted. In the following description, components having the same name as a component already described are assumed to have the same function unless otherwise specified, even if marked with a different sign.

Figure 12A:
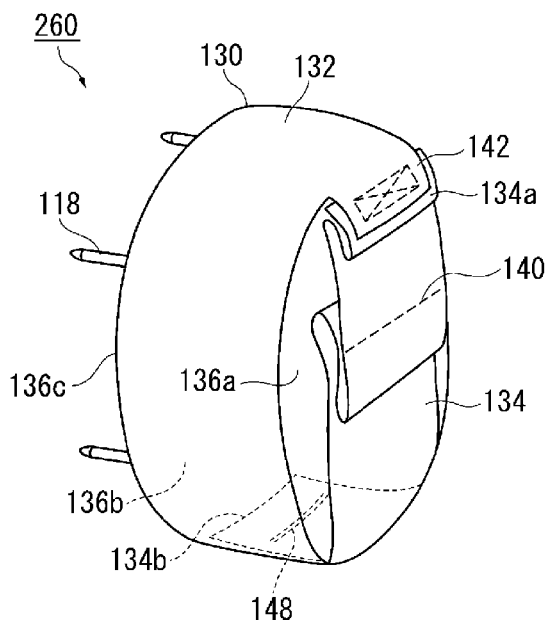
FIG. 12 is a diagram illustrating the fourth through sixth modified examples of the airbag module in FIG. 3(a).

FIG. 9 is a diagram illustrating a first modified example of the airbag module 105 in FIG. 2(a) (airbag module 200). FIG. 12(a) illustrates an airbag module 200, corresponding to FIG. 2(a). The cushion 202 provided with airbag module 200 differs in configuration from that of cushion 104 of FIG. 2(a) in that two panel members, front panel 204, and rear panel 206, are provided, in other words, side panel 124 is omitted. The cushion 202 can also be encapsulated in a retaining cover 130 (see FIG. 4(a)) when stowed and be passed over by the cloth-like part 134 when deployed.

Figure 9A:
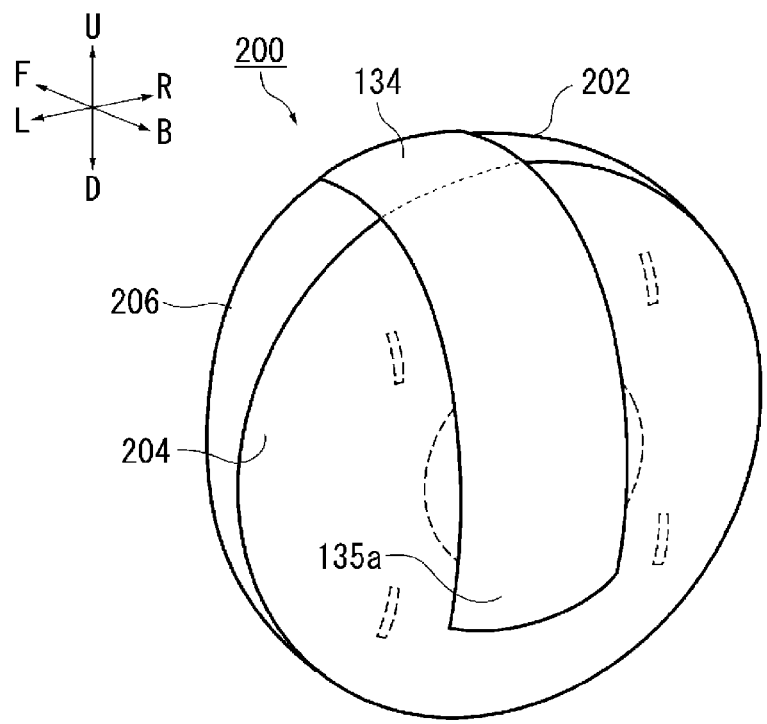
FIG. 9 is a diagram illustrating a first modified example of the airbag module in FIG. 2(a).
Figure 9B:
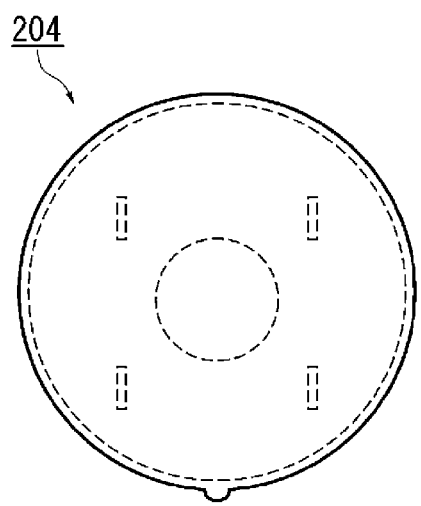
Figure 9C:
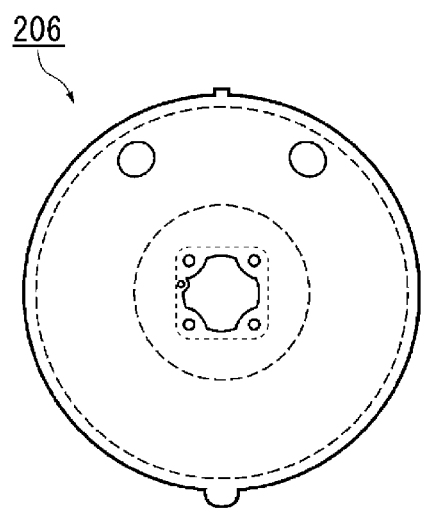

FIG. 9(b) is a diagram illustrating the front panel 204 of FIG. 9(a). The front panel 204 is circular in shape. FIG. 9(c) is a diagram illustrating the rear panel 206 of FIG. 9(a). The rear panel 206 is circular and is formed to approximately the same dimensions as the front panel 204. The cushion 202 of FIG. 9(a) can be formed by joining the edge of the front panel 204 to the edge of the rear panel 206.

Regarding the airbag module 200 with the configuration described above (see FIG. 9(a)), the cloth-like part 134 of the retaining cover 130 (see FIG. 4(a)) can suppress the behavior of the cushion 202 during deployment attempting to move toward the head 152 of the occupant 150, similar to the airbag module 105 in FIG. 8(a), or suppress the load when the cushion 202 during deployment contacts the head 152, preventing the head 152 from being pushed up and retroflexed backward.

Figure 10A:
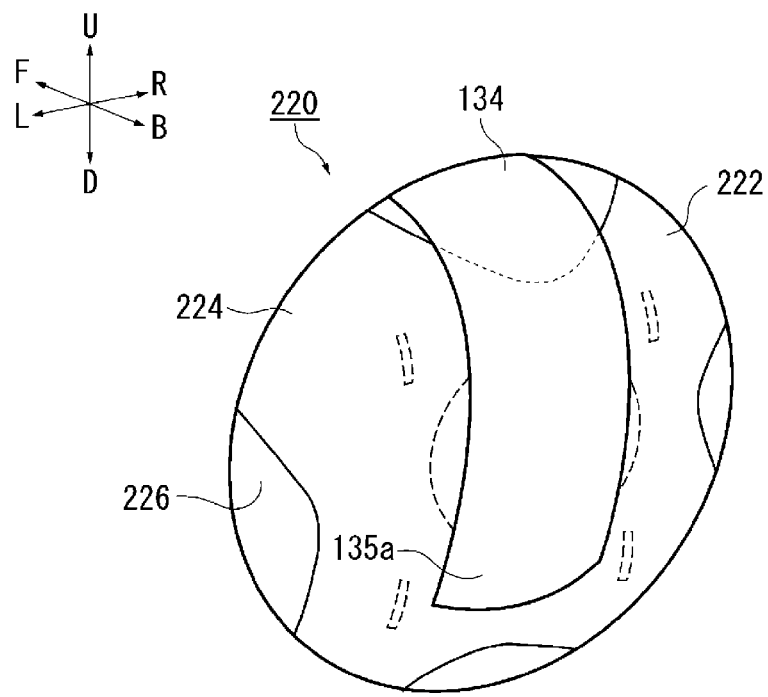
FIG. 10 is a diagram illustrating a second modified example of the airbag module in FIG. 2(a).

FIG. 10 is a diagram illustrating a second modified example of the airbag module 105 in FIG. 2(a) (airbag module 220). FIG. 10(a) illustrates an airbag module 220, corresponding to FIG. 2(a). Similar to the cushion 222 of FIG. 9(a), a cushion 202 provided with the airbag module 220 is composed of two panel members, a front panel 224 and a rear panel 226, but differs from the cushion 202 in that the front panel 224 and the rear panel 226 are rectangular.

Figure 10B:
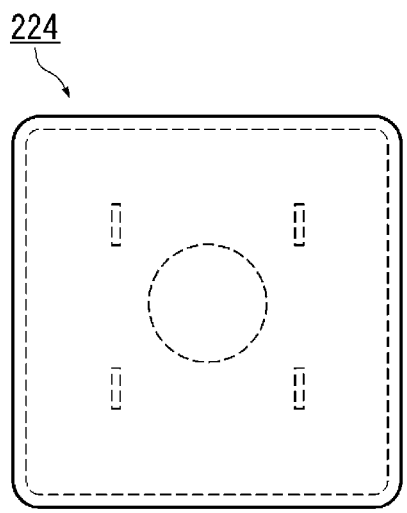
Figure 10C:
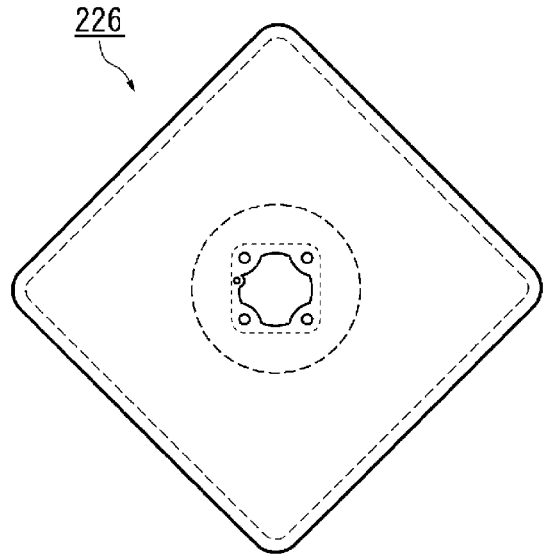

FIG. 10(b) is a diagram illustrating the front panel 224 of FIG. 10(a). The front panel 224 is formed in a near square shape. FIG. 10(c) is a diagram illustrating the real panel 226 of FIG. 10(a). The rear panel 226 is also nearly square in shape and is formed to approximately the same dimensions as the front panel 224. When forming the cushion 222 of FIG. 10(a), one of the front panels 224 or rear panels 226 is tilted at about 45° to the other and joined edge to edge with each other.

Regarding the airbag module 220 with the configuration described above (see FIG. 10(a)), the cloth-like part 134 of the retaining cover 130 (see FIG. 4(a)) can suppress the behavior of the cushion 222 during deployment attempting to move toward the head 152 of the occupant 150, similar to the airbag module 105 in FIG. 8(a), or suppress the load when the cushion 222 during deployment contacts the head 152, preventing the head 152 from being pushed up and retroflexed backward.

Figure 11:
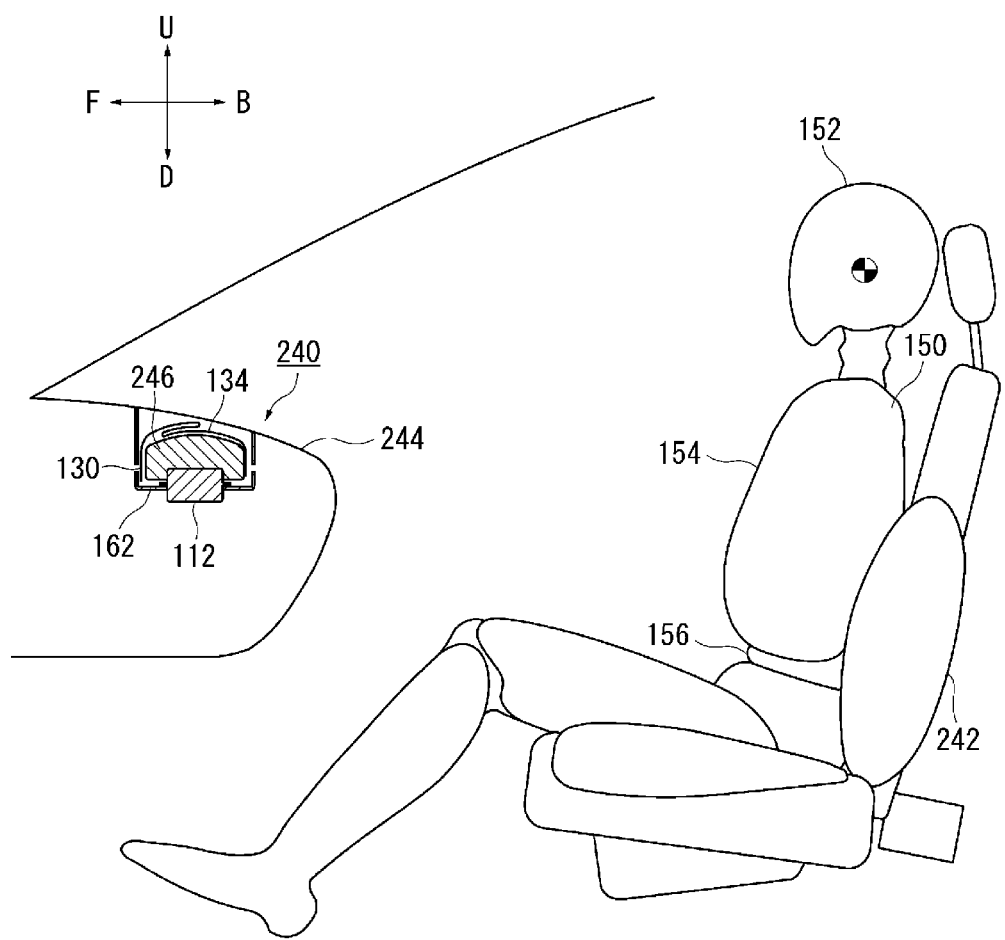
FIG. 11 is a diagram illustrating a third modified example of the airbag module in FIG. 6(a).

FIG. 11 is a diagram illustrating a third modified example of the airbag module 105 in FIG. 6(a) (airbag module 240). Whereas the airbag modules of each of the above examples were for the driver seat, the airbag module 240 is implemented for the passenger seat.

The airbag module 240 is stowed in the upper part of the instrument panel in front of the regular seating position of the passenger seat 242. As the distance between the installation site of the cushion 246 of the airbag module 240 and the occupant 150 is farther than a case of installation in the steering wheel 106, the capacity is larger than the driver seat cushion 104 as seen in FIG. 2(a) and the like. However, even in such an airbag module 240 for the passenger seat, the retaining cover 130 can be implemented and the cloth-like part 134 can be suitably used to prevent the head 152 of the occupant 150 from being retroflexed backward.

Figure 12B:
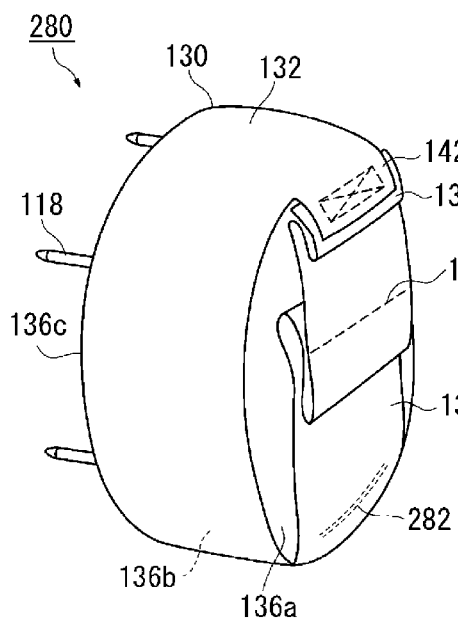
Figure 12C:
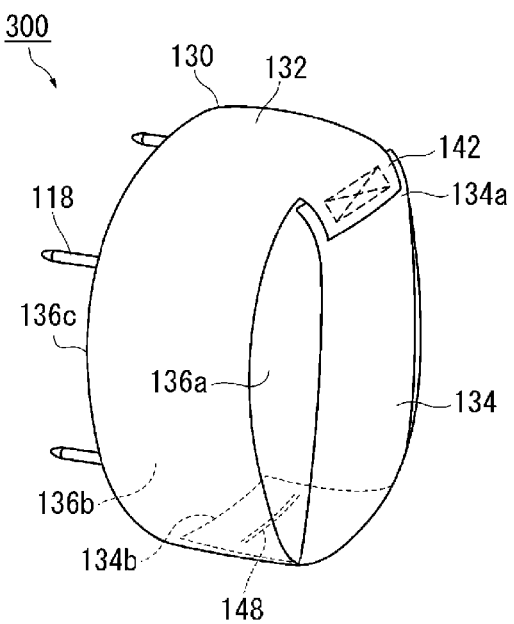

FIG. 12 is a diagram illustrating the fourth through sixth modified examples of the airbag module 105 in FIG. 3(*a*) (airbag modules 260, 280, and 300). FIG. 12(*a*) illustrates an airbag module 260 of the fourth modified example. Regarding the airbag module 260, the weak part 148 is located near the lower end 134*b* of the cloth-like part 134. With this configuration, when the cloth-like part 134 breaks at the weak part 148, the upper piece 135*a* (see FIG. 6(*c*)) is formed longer, such that the upper piece 135*a* more readily passes over an expanding and deploying cushion 104.

FIG. 12(*b*) illustrates an airbag module 280 of the fifth modified example. Regarding the airbag module 280, the weak part 282 of the cloth-like part 134 is provided at a position overlapping the lower part of the upper surface 136*a* of the cushion 104 in stowed form. The weak part 282 is able to efficiently receive the expansion pressure of the cushion 104 and break if positioned overlapping the upper surface 136*a* of the cushion 104, and can form a longer upper piece 135*a* (see FIG. 6(*c*)) by being provided on the lower side of the upper surface 136.

FIG. 12(*c*) illustrates an airbag module 300 of the sixth modified example. Regarding the airbag module 300, there is no fold formed in the middle of the cloth-like part 134 unlike the airbag module 105 in FIG. 3(*a*). Thus, depending on the dimensions of the cloth-like part 134, it can be placed over the cushion 104 without being folded back in the middle.

Figures 13A, 13B:
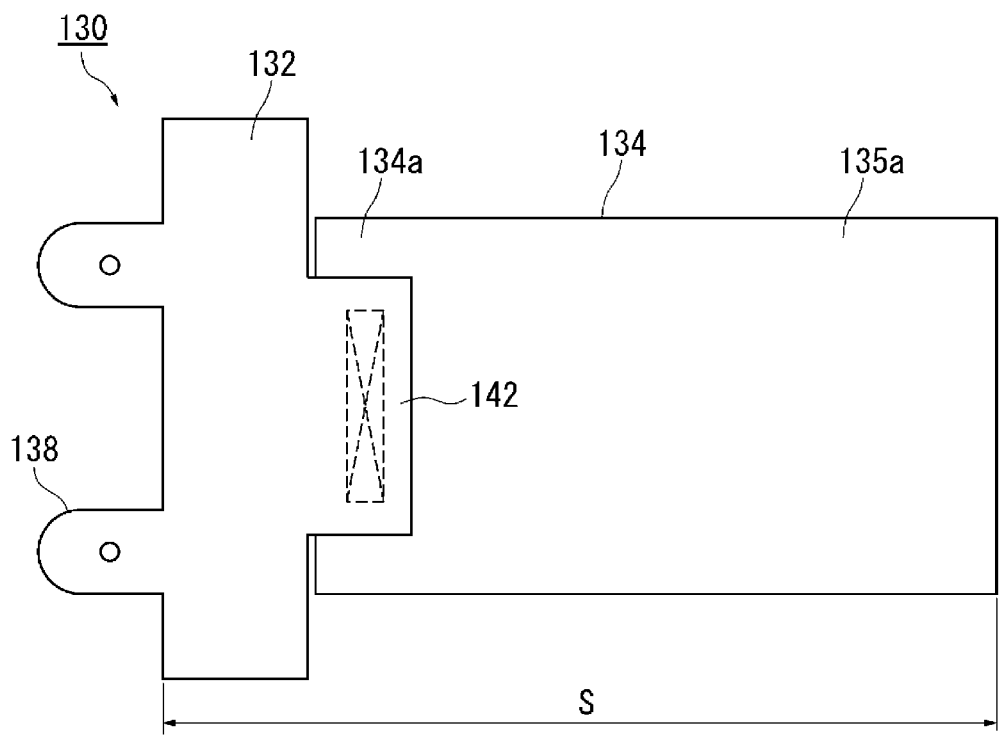
FIG. 13 shows the results of a test examining the dimensions of the fabric member in FIG. 5.

FIG. 13 illustrates the results of a test examining the dimensions of a fabric member 134 in FIG. 5. FIG. 13(*a*) illustrates the cloth-like part 134 unfolded on a flat surface. In the tests, the dimension S from the end of the tabs 138 of the side surface retaining part 132 to the tip of the upper piece 135*a* of the cloth-like part 134 was examined.

FIG. 13(*b*) shows the test results. The tests were performed on a total of 4 samples from A to D. Each fabric member sample has a different dimension S (see FIG. 13(*a*)) as described above. The tests were conducted to evaluate the cushion 104 during expansion and deployment, determining the deployment of each cloth-like part to an out-of-position (OOP) occupant 138 (see FIG. 8(*a*)), and determining the injury value (judged as OOP) of the out-of-position occupant 138. As explained with reference to FIG. 8(*a*), the non-normal seating position assumes that the occupant 138 is leaning out of the seat 102.

The deployment determination in FIG. 13(*b*) sought to determine whether or not the cloth-like part of each sample contacted the head 152 of the out-of-position occupant 138 during expansion and deployment of the cushion 104. As a result of the tests, sample A with a dimension of 250 mm was found to be in contact with the head 152 of the occupant 138, and sample B with a dimension of 220 mm was found not to be in contact thereof.

The OOP determination is based on whether or not the head 140 of the occupant 138 exceeded the standard injury value. As a result of the tests, deviation from the standard value was observed in sample D with a dimension of 170 mm. This was thought to be due to the short dimension S of the cloth-like part of sample D (see FIG. 13(*a*)), which resulted in a lack of force to press downward on the cushion 104 by the cloth-like part 134 as explained with reference to FIG. 8(*b*).

Based on the above, it was confirmed that the dimension S (see FIG. 13(*a*)) of the fabric member 134 is favorably between around 220 mm to 190 mm. A dimension S of the fabric member 134 in this range will enable the cushion 104 to not make contact with the head 152 of the occupant 138 (see FIG. 8(*a*)) during expansion and deployment of the cushion 104, suitably restraining the deployment behavior of the cushion 104 heading toward the head 152.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used for an airbag retaining cover that encapsulates an airbag cushion and a vehicle airbag device that includes this airbag retaining cover.

DESCRIPTION OF CODES

L1: Hidden line extending from the center of the rear panel,
L2: Boundary of the side panel and the front panel,
P1: Center of the front panel,
P2: Center of the rear panel in the height direction,
S: Fabric member dimensions,
W1: Width of the upper portion of the cushion,
W2: Width of the lower portion of the cushion,
100: Vehicle airbag device,
102: Seat,
104: Cushion,
104*a*: Upper portion of cushion,
104*b*: Lower portion of cushion,
105: Airbag module,
106: Steering wheel,
108: Hub,
110: Cover member,
112: Inflator
114: Rim,
116: Gas discharge port,
118: Stud bolts,
120: Front panel,
122: Rear panel,
124: Side panel,
126*a*, 126*b*: Vent holes,
130: Retaining cover,
132: Side surface retaining part,
134: Cloth-like part,
134*a*: Upper end side of cloth-like part,
134*b*: Lower end side of cloth-like part,
135*a*: Upper piece of cloth-like part,
135*b*: Lower piece of cloth-like part,
136*a*: Upper surface of stowed cushion,
136*b*: Side surface of stowed cushion, 136c: Lower surface of stowed cushion,
138: Tabs 140: Sewed seam,
142: Protruding piece,
144a, 144b: Side surface retaining part connecting parts,
146a: Cloth-like part connecting part
146b: Side surface retaining part connecting parts,
148: Weak parts,
150: Occupant,
152: Head,
154: Chest,
156: Abdomen,
160: Resin-coated surface,
162: Housing,
200: Airbag module of the first modified example
202: Cushion,
204: Front panel,
206: Rear panel,
220: Airbag module of the second modified example,
222: Cushion,
224: Front panel,
226: Rear panel
240: Airbag module of the third modified example,
242: Passenger seat,
244: Instrument panel,
246: Cushion,
260: Airbag module of the fourth modified example,
280: Airbag module of the fifth modified example,
282: Weak parts,
300: Airbag module of the sixth modified example.

The invention claimed is:

1. An airbag retaining cover that encapsulates an airbag cushion that is stowed in a stowable stowed form in front of the regular seating position of a vehicle, the retaining cover comprising:
a side surface retaining part that encapsulates around the side of the airbag cushion in the stowed form;
a cloth-like part that traverses the upper surface of the airbag cushion in the stowed form vertically; and
a weak part that is provided at a prescribed point on the cloth-like part, breaks under the expansion pressure of the airbag cushion, and thus divides the cloth-like part vertically into an upper piece and a lower piece, wherein
the upper piece of the cloth-like part is configured to be sandwiched between the airbag cushion and an occupant when the airbag cushion expands and deploys with the occupant in close proximity, and the upper piece of the cloth-like part suppresses the upward deployment of a center portion of the airbag cushion relative to side portions of the airbag cushion on either side of the center portion.

2. The airbag retaining cover according to claim 1, wherein the upper end of the cloth-like part is connected to the side surface retaining part above the airbag cushion.

3. The airbag retaining cover according to claim 1, wherein the lower end of the cloth-like part is in a state being inserted between the side surface retaining part and the airbag cushion.

4. The airbag retaining cover according to claim 3, wherein the lower end of the cloth-like part is connected to the side surface retaining part.

5. The airbag retaining cover according to claim 1, wherein the weak part is provided at a position overlapping the lower portion of the airbag cushion in a stowed form.

6. The airbag retaining cover according to claim 1, wherein the weak part is provided in the vicinity of the lower end of the cloth-like part.

7. The airbag retaining cover according to claim 1, wherein the surface of the cloth-like part on the opposite side to the airbag cushion has a higher coefficient of static friction than the surface thereof on the airbag cushion side.

8. The airbag retaining cover according to claim 1, wherein the surface of the cloth-like part on the opposite side of the airbag cushion is coated with a prescribed resin.

9. The airbag retaining cover according to claim 1, wherein the coefficient of static friction of the side surface retaining part is lower than the coefficient of static friction of the housing the airbag cushion in stowed form is stowed in.

10. The airbag retaining cover according to claim 1, wherein the side surface retaining part is formed from the same material as the airbag cushion.

11. The airbag retaining cover according to claim 1, wherein the weak part includes:
a slit that breaks the cloth-like part due to the expansion pressure of the airbag cushion;
a temporary sewed seam that connects the cloth-like part and the side surface retaining part which can break due to the expansion pressure of the airbag cushion; or
a heat weld that connects the cloth-like part and the side surface retaining part which can be disintegrated due to the expansion pressure of the airbag cushion.

12. The airbag retaining cover according to claim 1, wherein the airbag cushion in stowed form thereof is stowed in the steering wheel in front of the regular seating position of the driver seat.

13. The airbag retaining cover according to claim 1, wherein the airbag cushion in stowed form thereof is stowed in the upper part of the instrument panel in front of the regular seating position of the passenger seat.

14. A vehicle airbag device, comprising:
an airbag cushion stowed in stowed form in front of the regular seating position of a vehicle;
an inflator equipped inside the airbag cushion; and
an airbag retaining cover that encapsulates the airbag cushion, wherein the retaining cover includes:
a side surface retaining part wrapped around the side surface of the airbag cushion in stowed form, a cloth-like part provided traversing vertically on the upper surface of the airbag cushion in stowed form; and
a weak part provided in a prescribed location on the cloth-like part that divides the cloth-like part into an upper piece and a lower piece due to the expansion pressure of the airbag cushion, the upper piece configured such that if the airbag cushion expands and deploys with an occupant in close proximity, the upper piece of the cloth-like part becomes sandwiched between the airbag cushion and the occupant, and the upper piece of the cloth-like part suppresses the upward expansion of a center portion of the airbag cushion relative to side portions of the airbag cushion on either side of the center portion.

* * * * *